2 Sheets—Sheet 1
G. T. CHATTAWAY.
Chuck Attachment for Lathes.
No. 217,062. Patented July 1, 1879.
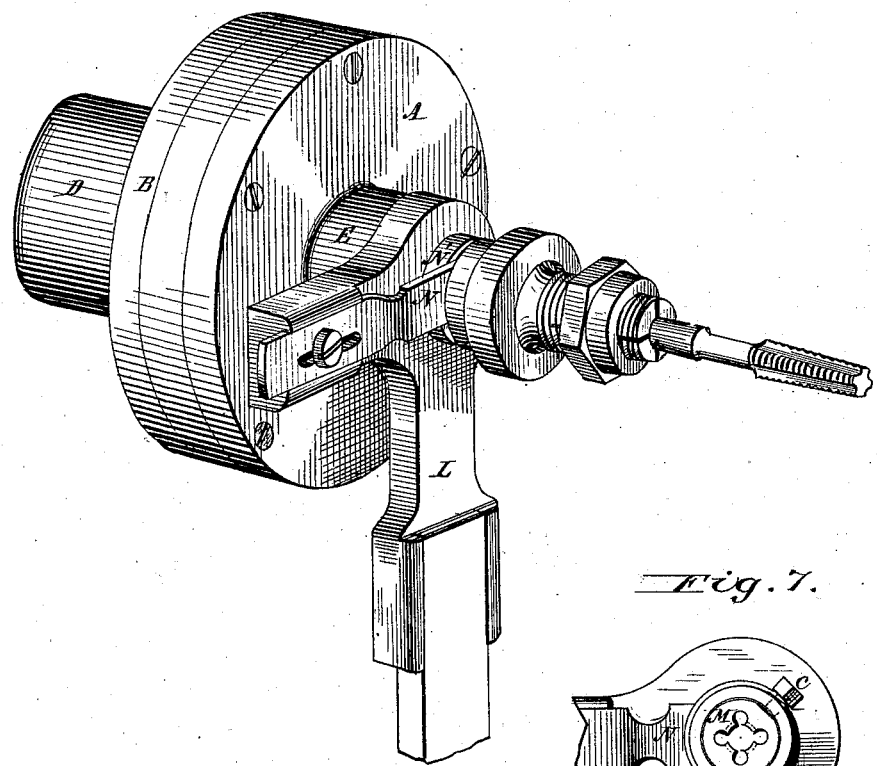
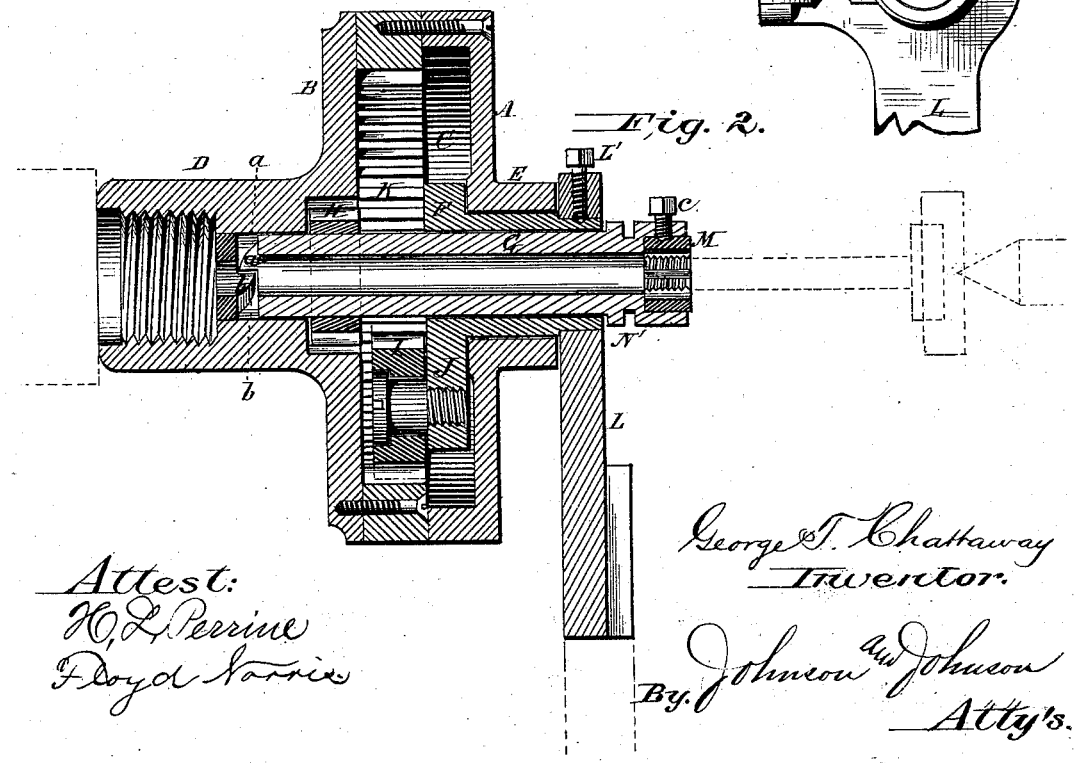
Attest:
H. L. Perrine
Floyd Norris
George T. Chattaway
Inventor.
By Johnson and Johnson
Atty's.

G. T. CHATTAWAY.
Chuck Attachment for Lathes.
No. 217,062. Patented July 1, 1879.
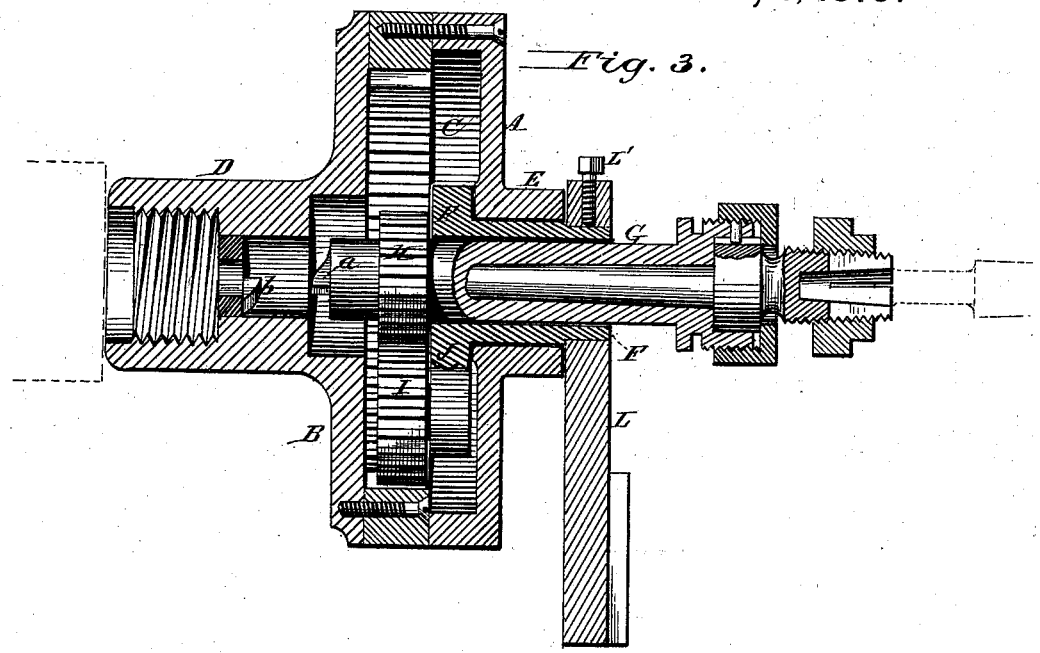
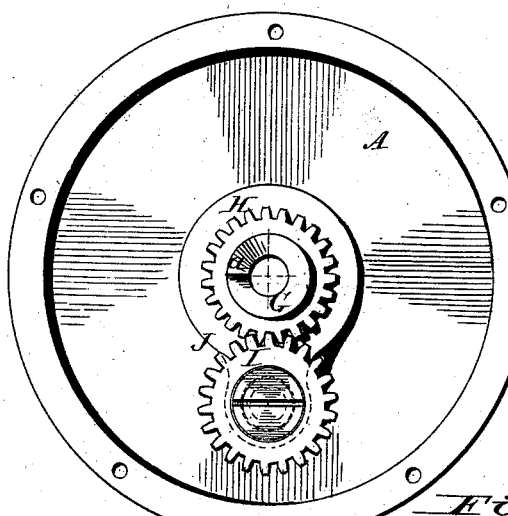
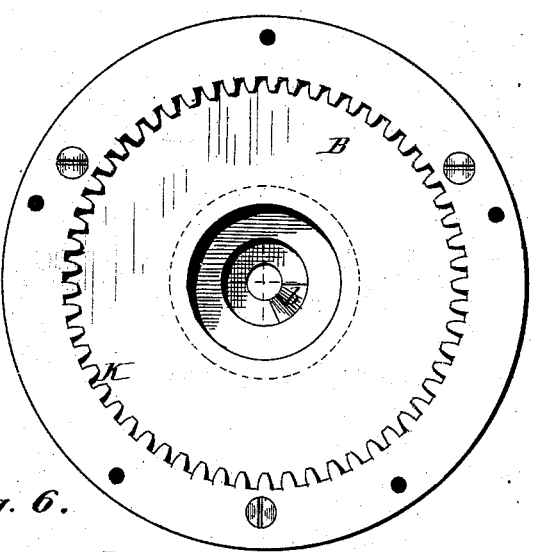
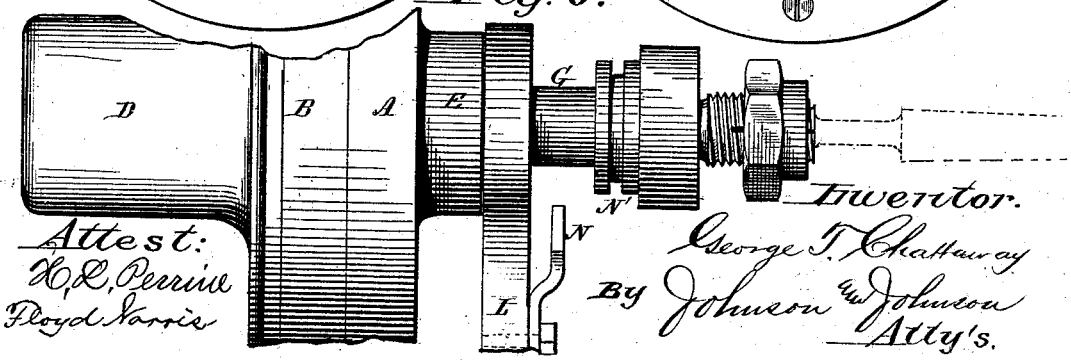

UNITED STATES PATENT OFFICE.

GEORGE T. CHATTAWAY, OF BROOKLYN, ASSIGNOR OF ONE-HALF HIS RIGHT TO ANDREW B. DOBBS, OF NEWBURG, NEW YORK.

IMPROVEMENT IN CHUCK ATTACHMENTS FOR LATHES.

Specification forming part of Letters Patent No. 217,062, dated July 1, 1879; application filed February 20, 1879.

*To all whom it may concern:*

Be it known that I, GEORGE T. CHATTAWAY, of Brooklyn, in the county of Kings and State of New York, have invented certain new and useful Improvements in Chuck Attachments for Lathes, of which the following is a specification.

My improvement consists of an attachment or chuck for tapping, threading, and drilling, adapted for use upon the screw end of the pulley-mandrel of an ordinary lathe in the same manner as a chuck is used for holding the work in such lathe.

My object is to do the work hitherto done by separate machines by means of a single attachment complete in itself, and adapted for use without requiring any change in the construction or manner of using the common lathe.

The attachment is screwed onto the pulley-mandrel, and is revolved by it continuously in the same direction, while the spindle for carrying the tools is adapted to be driven forward by said attachment with a slow revolving motion in working, and to be driven backward with a rapid revolving motion when the work is done. This forward and backward revolution of the tool-carrying spindle is effected by giving the spindle an endwise adjustment within the attachment and independent of it, the backward rapid revolution being required in tapping and threading, to allow the work to be quickly withdrawn from the tool. In drilling, however, this reverse motion would destroy the cutting-edges of the drill in moving the work from it, and I therefore provide means for locking the tool-carrying spindle within the attachment, so that when used for drilling it will be continuously driven forward, and not be liable to be drawn out in moving the work away from it.

The spindle projects beyond the face of the attachment to receive the proper tool, and it is fitted for endwise adjustment and rotation within a bushing-sleeve connected with the frame. An interior clutch device is formed, part upon the inner end of the spindle and part within the screw-extension of the attachment, and these clutch parts are engaged when the spindle is forced back by the pressure of the work to give the slow forward movement of the tool. The cutting being finished, the work is drawn back in a way well understood, and the spindle is thereby drawn outward a short distance, to release said clutch-connection and engage a pinion fixed on the spindle with a pinion on the fixed arm of the bushing-sleeve, and as this arm-pinion always remains in gear with an internal gear of the attachment, the spindle will thereby be driven with a rapid backward rotation. It will be seen, therefore, that it is a complete appliance in itself, and is operated by a single-belt mandrel to do a variety of work.

The die for screw-threading is secured in the front end of the spindle; but for screw-tapping, tapping nuts, and for drilling, a nose-chuck will be applied to the end of the spindle for holding the tap or drill.

The spindle bushing-sleeve which carries the idler-pinion is secured between the ways of the bed by an arm clamped on the end of said sleeve, and, extending down between said ways, is fastened beneath the bed.

The endwise shifting of the tool-spindle carries its reversing-pinion into and out of gear with the idler-pinion of the bushing-sleeve, and the clutch part of the spindle into and out of gear with the part formed within the eye of the screw-extension, and the chamber within which this reversing-gear works is enlarged to admit of such adjustment of said spindle-pinion.

Referring to the drawings, Figure 1 represents a view, in perspective, of a tapping, threading, and drilling chuck embracing my invention; Fig. 2, a longitudinal section of the same, the tool-carrying spindle being connected by its clutch to produce its forward slow rotation; Fig. 3, a similar section, the tool-carrying spindle being adjusted and connected with the internal gear for giving the spindle its rapid backward movement; Fig. 4, an inside view of the face-plate of the chuck-head, showing the pinions of the spindle and of the bushing-sleeve; Fig. 5, an inside view of the base of the chuck-head, showing the internal gear and part of the spindle-clutch. Fig. 6 shows the tap or drill attachment to the spindle, and Fig. 7 shows the die for screw-threading.

I denominate my invention a "tapping, threading, and drilling chuck or attachment," because it can be applied to any spindle-machine in the place of the usual chucks used for grasping the work to be operated upon, while my improved chuck is adapted for holding the die, tap, or drill to operate upon the work.

The chuck-head consists of a face-plate, A, and a base, B, united together by screw-bolts, so as to form an interior annular chamber, C, for a purpose to be presently described. It is screwed to the mandrel by a neck-extension, D, from the base, and is driven by the mandrel. The face-plate has a central front collar-extension, E, through which a bushing-sleeve, F, passes and forms the bearing for a hollow tool-carrying spindle, G, which is of sufficient length to project beyond the collar-extension, and is provided with suitable means for carrying the working-tools. The spindle has no fixed connection with the chuck-head, but is driven by it by means of a clutch formed by a projection, $a$, on the inner end of said spindle, and a similar projection, $b$, in the eye of the base, adapted to interlock, and thus connect and drive the spindle forward by the chuck.

The spindle is adapted to have an inward adjustment in the line of its axis within the attachment to effect its connection therewith by said clutch to drive the spindle forward, and an outward adjustment within said attachment to cause the spindle to be revolved rapidly backward when the work is done and is being moved away from the tool. This reverse motion of the spindle is effected by drawing the spindle out by moving back the work, which is held on the tail-stock spindle, so as to disconnect the spindle-clutch part $a$ from the eye-clutch part $b$, and bring the pinion H on the spindle in gear with a pinion, I, carried by an arm, J, projecting from the inner end of the bushing-sleeve F at right angles to its axis, said arm-pinion being always in gear with the internal gear K of the attachment, and as the latter is only revolved forward the spindle must be rapidly turned backward when its pinion H is brought into gear with the pinion I, carried by the fixed bushing-sleeve.

The changing of the motion of the tool-carrying spindle, it will be seen, is effected by means carried by and arranged within the chamber of the chuck-head.

Friction-rolls may be used in place of the gearing, and any suitable form of clutch may be used.

The bushing-sleeve F, however, must have a fixed relation to the frame of the lathe, and I have shown one means of effecting such connection, which consists of an arm, L, fixed to the outer end of the bushing-sleeve and secured to some part of the stationary frame, as shown in Fig. 1.

When the spindle is adjusted to work by its clutch its pinion passes into a recess in the base of the chuck-head, and when the adjustment is made to reverse the motion of the spindle its pinion is brought in line with the internal gear, the bushing-pinion which meshes with said gear occupying an intermediate position.

The die M for threading is secured in a countersink in the front end of the spindle by a screw, $c$, or in any suitable way.

For tapping and drilling the tools may be secured to the spindle end by a nose-chuck in any suitable way. In drilling, however, it is not necessary to reverse the motion of the drilling-spindle, and I have arranged a slide, N, on a branch of the fixed bushing-sleeve arm L, adapted to enter a groove, N', in the enlarged end of the spindle, and thus hold it back and maintain its clutch-connection with the chuck-head.

Were it not for this slide-lock I could not use the attachment for drilling, because in drawing back the work the tool-carrying spindle would be liable to be drawn out and engage its reversing-pinion and revolve the drill backward, which would destroy its cutting-edge; and as no reverse motion is required in drilling, I therefore use the locking-slide to prevent any end movement of the tool-carrying spindle, and thus adapt the attachment for drilling.

The internal gear will be separate, and bolted between the face-plate and the base.

By this construction I use a chuck-head in which its tool-carrying spindle has a capacity for an endwise adjustment within the chuck-head, and by suitable means arranged therein and carried thereby it is adapted for revolving at a slow forward motion while under work, and at a rapid backward motion to release the work, while at the same time the lathe is running forward, and no attention is required to the machine on which my improved chuck is used.

The chuck-head not only serves as the means for carrying and operating the tool-driving spindle, but carries also the devices necessary for reversing the motion of the tool-carrying spindle, and in this particular gives highly important advantages as a lathe attachment. The nose-chuck slips into the spindle, and is secured by a box-nut screwed upon the threaded end of the spindle. Said nose-chuck has cross-slits, for the purpose of giving a spring-grasp to receive a tapering screw-nut to hold the tap or drill firm in said nose. The die may also be held in place by this box-nut. The bore of the spindle has a pin, which enters a groove in a collar on the nose-chuck or in the die to prevent them from turning when working.

In threading or tapping, the spindle is kept engaged with its clutch by the pressure of the work against the tool, and after the work is finished the spindle of the tail-stock, on which the face-plate is held, is then drawn back, which draws out the tool-spindle a sufficient distance to disengage the clutch and engage the pinion H with the pinion I of the bushing-sleeve, and thus rapidly reverse the motion of the tool-spindle as the work is moved away.

The locking-slide N is used for the purpose of holding the spindle back against the clutch in drilling, and thus prevent the spindle from being drawn from said clutch after the drilling is done. This withdrawal would be likely to occur by the friction and touching of the work upon the drill as the work is moved back, and would reverse the motion of the spindle, which would destroy the cutting-edges of the drill. This the slide prevents by keeping the spindle-clutch always engaged when drilling.

The face and back plates A and B, with the internal gear secured between them, form the close chamber C, within which the clutch driving and reversing gear are arranged, and within which the spindle is shifted so as to engage either its driving-clutch or its reversing-gear. The clutch parts $a$ and $b$ limit the inward adjustment of the spindle, while its outward adjustment is limited by the pinion H coming against the inner end of the bushing-sleeve.

The device is simple, and as a lathe attachment is highly useful, because by it the common lathe is adapted for a variety of work hitherto not possible in the use of such lathe. In this particular my improvement is a very different thing from a complete machine in which fast and loose pulleys, with internal reversing-gear and automatic appliances, are employed for shifting the belt and for operating a clutch in connection with a spindle having no endwise adjustment.

My improvement also differs from what is known as a "pull-and-push screw-tapper," in which two pulleys are used in connection with a separate spindle-clutch for each, and in which one of said pulleys is driven by a crossed belt, and the endwise movement of the spindle is used to clamp the driving or the reversing pulley, as may be required.

The bushing-sleeve F projects sufficiently beyond the collar-bearing E to receive the arm L, which is secured to said sleeve by a screw, L', whereby said arm is readily attached to the sleeve and to the bed.

All the parts of the attachment are separate and easily put together.

I claim—

1. A lathe attachment or chuck in which a close chamber is formed by the connected face and back plates A and B with an interior gear, K, secured between them, and a screw socket-extension, D, of said back plate provided with an interior clutch part, $b$, in combination with the tool-carrying spindle G, provided with the clutch part $a$ and a pinion, H, and the bushing-sleeve F, provided with the pinion I and the holding-arm L, said spindle being held in its clutch engagement for slow forward revolution by the pressure of the work against the tool, and drawn out to engage the reversing-gear for rapidly revolving the tool backward in tapping and threading.

2. The combination, in a lathe attachment or chuck constructed with the interior clutch part, $b$, and a tool-carrying spindle, G, provided with a clutch part, $a$, the bushing-sleeve F, and its holding-arm L, of the slide N on the fixed bushing-sleeve, adapted to be locked with the spindle for maintaining its clutch-connection in drilling, substantially as herein set forth.

3. A lathe attachment or chuck consisting of the face-plate A, a base, B, and a screw-neck extension, D, united with and inclosing an internal gear, K, said extension D having an interior clutch part, $b$, an endwise-adjustable tool-carrying spindle, G, provided with a terminal clutch-part, $a$, and the pinion H, the bushing-sleeve F, provided with a reversing-pinion, I, a holding-arm, L, and a locking-slide, N, for the spindle, whereby said attachment is adapted for tapping and threading by forward and reverse motions of the tool-carrying spindle, and convertible for drilling by a forward motion only, substantially as herein set forth.

4. In a lathe attachment or chuck, the attachable arm L, secured to the bushing-sleeve F and to the lathe-bed, substantially as described, and provided with a branch arm for the locking-slide N, in combination with a tool-carrying spindle, G, provided with a groove, N', and a terminal clutch part, $a$, and the base-plate part D, provided with the interior eye-clutch part, $b$, whereby said arm serves to hold the bushing-sleeve from turning, and carries the means for locking the spindle in its clutch-connection, all constructed for use as described.

5. In a lathe attachment or chuck, the face-plate A and the base-plate B, united with and inclosing the internal gear, K, and forming a closed chamber, in combination with an endwise-adjustable spindle, G, provided with the pinion H and the terminal clutch part $a$, the clutch part $b$, formed in the eye of said base part, the bushing-sleeve F, its holding-arm L, and its reversing-pinion I, the said spindle-pinion H and the clutch part $a$ being adapted for adjustment with said spindle within said closed chamber, as and for the purpose set forth.

In testimony whereof I have hereunto set my hand in the presence of two witnesses.

GEORGE T. CHATTAWAY.

Witnesses:
G. W. WILSON,
A. H. MERRITT.